Nov. 12, 1929.  W. S. WESTON  1,735,067
SCREEN
Filed Sept. 7, 1926  2 Sheets-Sheet 1
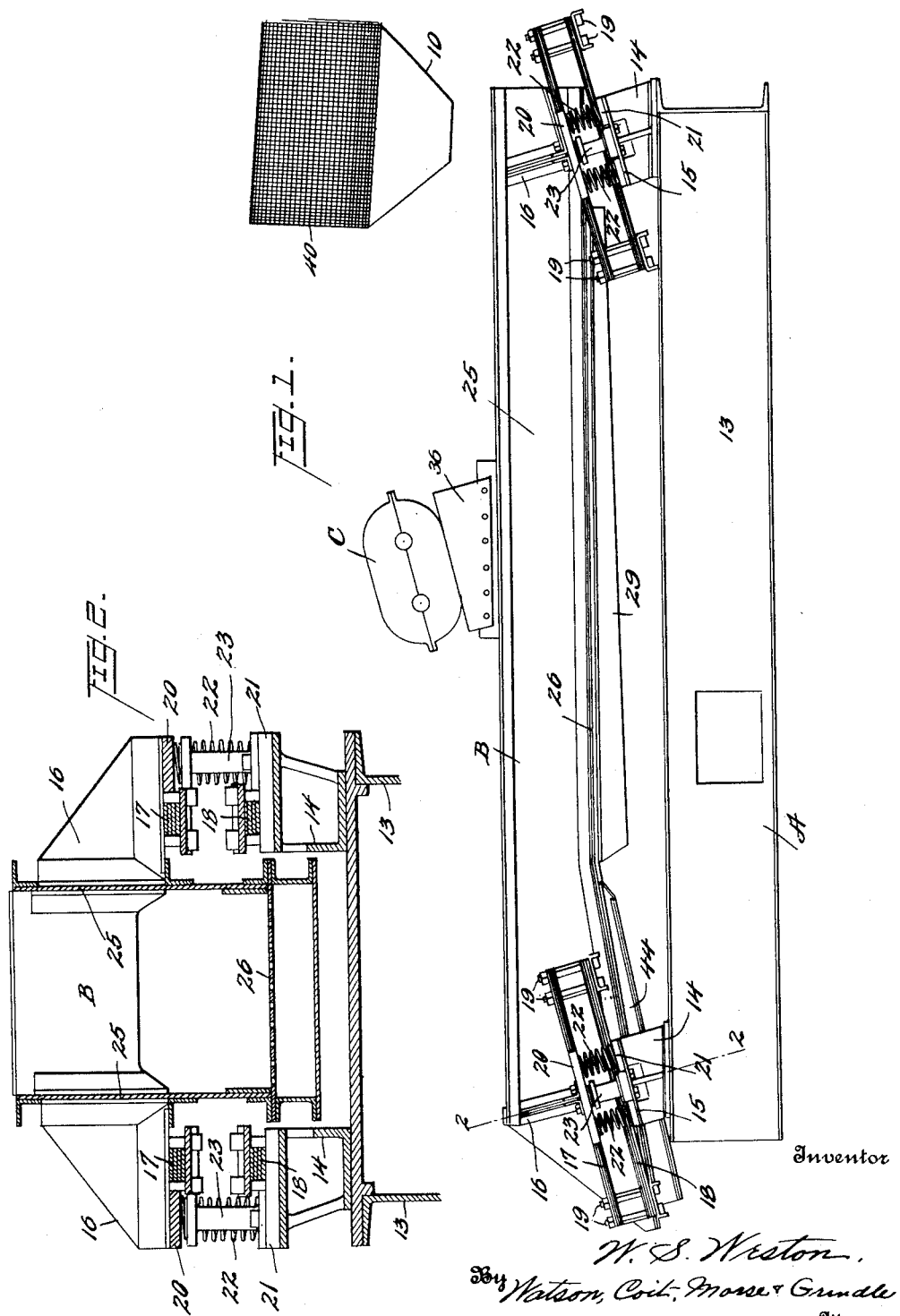
Inventor
W. S. Weston.
By Watson, Coit, Morse & Grindle
Attorney

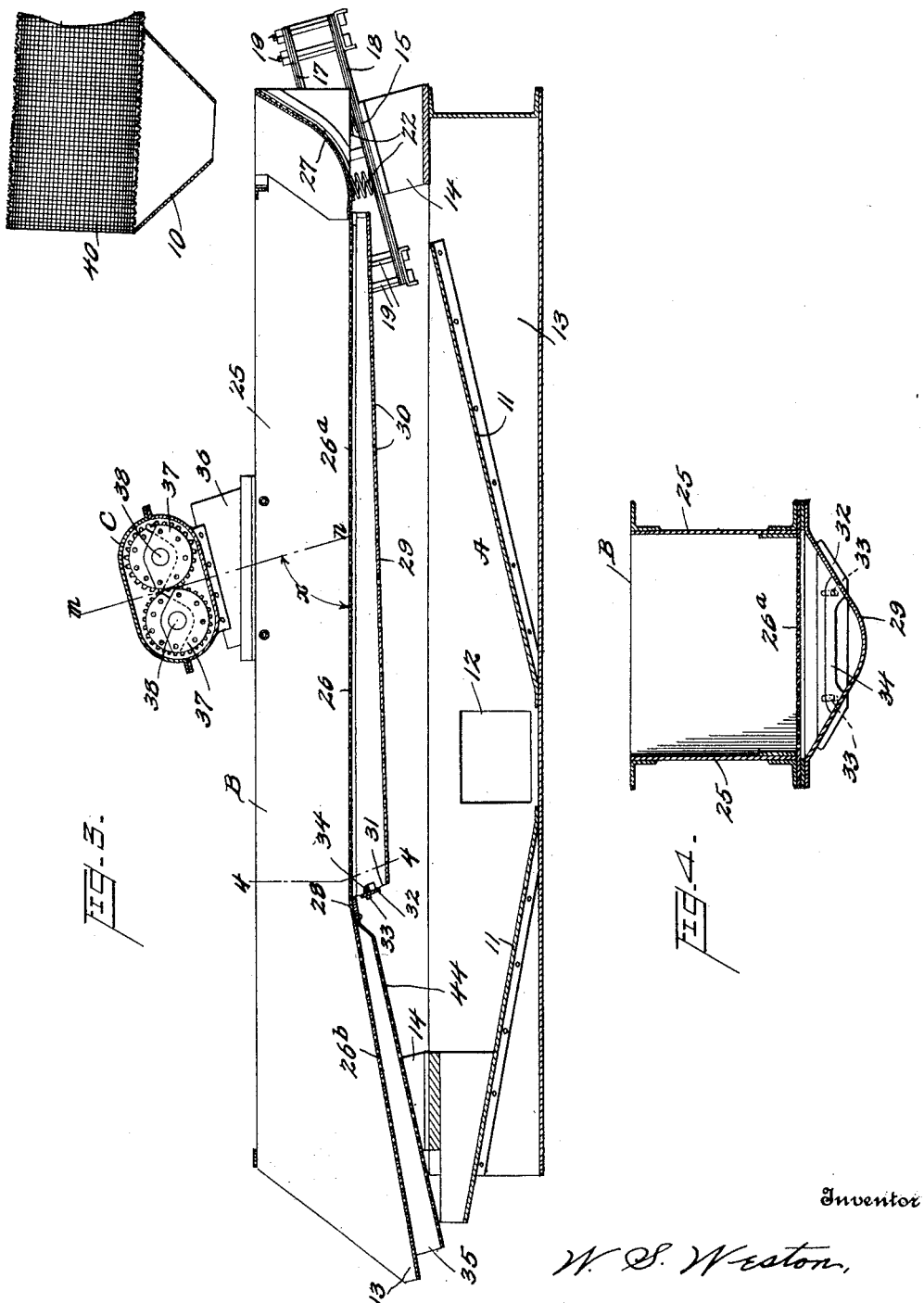

Patented Nov. 12, 1929

1,735,067

UNITED STATES PATENT OFFICE

WILLIAM STEVENSON WESTON, OF COLUMBIA, SOUTH CAROLINA

SCREEN

Application filed September 7, 1926. Serial No. 134,043.

The present invention relates to apparatus for separating granular materials according to size and particularly to screening appliances.

It has long been a problem in certain industries to separate an aggregate containing pieces of material of all sizes varying from large lumps to small grains, quickly and economically into portions containing individual pieces of approximately the same size, that is, to separate and classify the material according to size of particles. This problem is especially difficult when the particles which go to make up the mass or aggregate vary in size between wide limits and when the aggregate contains a considerable portion of finely divided particles such as dust. The product of rock crushing machines includes portions of rock which may be several inches or more in diameter, quantities of smaller particles varying in size down to those which have a diameter of only a small fraction of an inch, and finally a considerable proportion of particles so fine as to be properly classifiable as dust. The larger pieces of rock may be easily separated out from this mass by means of screens of a well known character, that is, the pieces of rock having a diameter of say ¾ of an inch or greater, may be easily screened out. To separate the dust and dirt from the pieces of rock of smaller diameter to obtain an absolutely clean product which may, for instance, be used in concrete work without further cleaning, has been difficult to do economically by any machines or appliances heretofore designed or suggested. I have developed a screening appliance by means of which dust and dirt and any particles below a selected minimum size may be quickly, thoroughly and economically removed from the aggregate resulting from the operation of rock crushing machines, or the aggregate of any other mining or crushing operation.

Many appliances have been heretofore designed or suggested for grading granular materials, principally by sifting operations, but such machines have not proven entirely satisfactory due to their inability to economically and quickly remove all of the dust and dirt from the larger grains, and for other reasons. I have discovered that by passing the aggregate in a stream of water over a substantially horizontally disposed and rapidly vibrating screen, the materials may be quickly and accurately graded, all those particles having a less diameter than the screen openings passing quickly through the screen and the remainder being discharged therefrom in a perfectly clean condition and well suited for use in concrete and cement work in which clean sand and gravel is requisite. The apparatus which I employ has many novel features and important advantages which will be hereinafter distinctly pointed out. The apparatus also may have various forms and that embodiment of the invention which is herein disclosed is given therefore by way of example only.

In the drawings:

Fig. 1 is a side elevation of my improved screening apparatus;

Fig. 2 is a section on line 2—2 of Figure 1;

Fig. 3 is a longitudinal vertical section through the apparatus; and

Fig. 4 is a section on line 4—4 of Figure 3.

The particular screening apparatus illustrated comprises essentially a trough like base portion indicated generally at A and which may be supported upon a concrete block or other firm foundation, the flume like screen superposed above the base and indicated generally at B, and the vibration engine indicated at C. The screen B is substantially parallel to and directly above the base A and is supported by means of springs at its four corners so that it may be given, by means of the vibrating engine C, a vibratory movement. The aggregate to be sifted or graded falls onto the upper end of the screen from a hopper 10, accompanied by a considerable flow of water. The fine materials or particles and nearly all of the water pass through the screen and fall into the trough like base A, being guided by the inclined plates 11 toward the discharge orifice 12. The larger materials which do not pass through the screen are discharged from its lower end at 13 into a bin or suitable receptacle. From this brief description, the general arrangement of the various elements of the invention will be apparent and a more detailed description of the apparatus, together with its exact mode of operation, will now be given.

Both the base and the vibrating screen structures are preferably fabricated of steel and resemble box girders in cross section. Thus the base comprises two parallel channel members 13, 13 which are connected by the inclined plates 11, 11. Mounted on each corner of the base is a pedestal 14. The pedestals are of metal and may be cast or built up in any suitable manner, but each is provided with an inclined upper surface as indicated at 15, the two upper pedestal surfaces 15, 15 at each end of the base being disposed in the same plane and the two planes thus established being parallel. In other words, all of the pedestal upper surfaces make equal angles with the horizontal and are inclined in the same direction. Secured to the outer walls of the screen B at approximately its corner points are brackets 16 of substantial construction and these brackets are arranged respectively in planes normal to the inclined surfaces 15 of the pedestals. Secured to each bracket at its mid point is a leaf spring 17 and secured to each pedestal and disposed parallel to the inclined upper surface thereof and parallel to each spring 17, is a second leaf spring 18. The ends of these leaf springs are held in fixed space relation by suitable bolts 19 provided with spacing sleeves. Positioned between each pair of blocks 20 and 21, which are secured to the bracket and pedestal respectively, are two coiled springs 22, these coiled springs being disposed equidistantly from the plane of the bracket 16 and on opposite sides of a central post or stop 23, which is secured to the pedestal and has its upper end terminating in close proximity to the upper block 20.

As can be seen, the screen B itself is a flume like structure comprising rather deep metallic parallel side plates 25, 25 and a perforated bottom plate 26. A curved end plate 27 at the upper end of the screen receives the water and aggregate which fall from the hopper 10 and directs this material along the upper surface of the rectangular screen plate 26. The screen plate is of metal and may be formed in several sections for convenience in assembly and repair. It is of sturdy character and is rigidly secured to the side plates 25. The first or upper section 26$^a$ of the screen plate is very nearly horizontal, having an inclination of only about 3/8 of an inch to the foot. The lower section 26$^b$ of the screen plate, which joins the upper section along the line indicated at 28, has considerably more inclination, the slope of this portion being approximately 1 1/4 inches to the foot. Beneath the upper section 26$^a$ of the screen plate is suspended a pan 29 which receives the water and fine materials which pass through the screen plate. This pan is provided with a plurality of holes 30 through which a portion of the water and fine material flowing into it may escape into the base, but the greater portion of this water and material escapes through the open end 31 of the pan and the outflow may be regulated at this point by means of a gate 32 adjustably secured by bolts 33 to a bridge member 34 which extends across the open end 31. Pan 29 serves as a bottom for the screen box and by means of this pan and its associated flow gate 32 the screen plate 26$^a$ may be kept at all times submerged. Beneath the lower section 26$^b$ of the screen plate a second pan 44 is provided, this pan having small apertures through which a portion of the material and water may escape into the base or flume A and having its lower end open at 35.

The vibrating engine extends across the flume or screen B having its ends mounted upon pedestals 36. The upper surfaces of these pedestals have the same inclination respectively as the upper surfaces of the pedestals 14 and the construction of the vibrating engine is such that it exerts forces upon the screen tending to vibrate it along a line normal to the inclined surfaces of the pedestals 14 and 36. The engine is of the eccentric weight type and is designed and constructed to exert rapidly alternating positive and negative forces on the screen B along the line $m$—$n$ (Fig. 3). It comprises essentially two weights 37, 37 eccentrically mounted respectively on parallel shafts 38, 38 which are geared together for simultaneous rotation. Any suitable driving means may be employed. The spring supports at the corners of the screen are so designed and constructed that the screen may vibrate in the direction of line $m$—$n$ and in no other direction, the arrangement of leaf springs making certain that no endwise movement of the screen or flume B can occur. The line $m$—$n$, it will be observed from Fig. 3, makes an acute angle $x$ with the plane of the upper screen plate and hence it will be observed that any material resting either upon the upper or lower screen plate will be given, if these plates are vibrated along the line $m$—$n$, a forward and downward hopping motion with each vibration of the engine. In practice, the engine is driven by any suitable means at a speed of 1150 revolutions per minute and it follows hence that the entire screen B is given 1150 up strokes and 1150 down strokes per minute. In the particular apparatus which has been put into practice, the amplitude of vibration of the screen is 3/8 of an inch.

Above the hopper 10 is the upper end of a cylindrical revolving screen 40 and into this screen is passed the output of a rock crushing machine together with a quantity of flowing water. All particles of the aggregate which will pass through a 3/4 of an inch ring will fall from the hopper 10, with a considerable quantity of water, and this water and material, under a head of three feet but which may be greater or less if desired, flows outwardly onto the screen plates. The apertures in the upper screen plate 26ª are $\frac{3}{16}$ of an inch in diameter and, due to the joint action of the rapidly flowing water and the rapid vibration of the screen B, all particles having a diameter less than $\frac{3}{16}$ of an inch pass through the screen plates and make their escape from the opening 12. All particles which will not pass through a $\frac{3}{16}$ of an inch opening will be delivered onto the lower screen plate 26ᵇ the perforations of which are $\frac{3}{8}$ of an inch. Those which do not pass through screen 26ᵇ are delivered at 13 to a receiving bin in a washed and entirely clean condition. Those particles which do pass through screen 26ᵇ fall upon screen 44, which has $\frac{3}{16}$ inch apertures, and this material is again screened, that portion rejected being discharged at 35.

A sufficient quantity of water is discharged onto the upper end of the screen to carry the materials, that is, to impel them toward the discharge end of the screen and to prevent piling up at the forward end. The screen is so designed, or the damper 32 is so regulated that the upper screen plate is continually submerged in water and so that but little water passes over onto the lower screen plate, the material which passes onto the lower plate being substantially free of water. The bulk of the material which passes onto the screen is sifted or screened in passing over the upper screen plate, but the lower screen plates are nevertheless useful in completing the operation. Their greater inclinations insure the movement of material along their surfaces although very little water is present.

Due to the fact that the upper screen plate is continually submerged and to the fact that it is vibrating at high speed along a line very nearly normal to its surface, the screening operation is carried on with great rapidity and efficiency. The body of water, as well as the particles to be screened, moves rapidly relatively to the plate as the latter is vibrated and hence the surging of the water upwardly and downwardly through the small holes of the plate tends to maintain these openings at all times entirely free. This surging is brought about in part by a slight whipping motion or vibration of screen 26ª relatively to pan 29, that is because of a slight secondary vibration of the screen 26ª. If a particle becomes wedged in one of the openings, the action of the water thereon soon dislodges it.

As has previously been pointed out, the leaf springs positioned at the corners of the screen serve to constrain the screen to vibrate along the line m—n. The actual weight of the screen box is actually carried, however, by the coil springs 22 and it is apparent that other guide means might be resorted to if desired. Springs 22 are designed to carry the dead weight of the flume or screen box together with its load of water and stone. I have found in actual practice that the length and character of the vibratory movement of the screen may be changed by inserting shims beneath the coil springs or withdrawing them. By adding shims the action of the springs is stiffened on the downward movement of the screen and the screen caused to terminate such movement more abruptly. The amplitude of the screen vibrations may also be adjusted in this manner. Control over the amplitude of vibration and abruptness of termination of downward movement of the screen is of great advantage to the operator in that he may make adjustments which will insure the most rapid screening of any particular material.

In actual practice, I have introduced the water and stone onto the screen under such head that it flows across the plate at a speed of approximately seven feet per second. Separation of the materials, therefore, obviously occurs at a high rate of speed. This rapid separation may be said to result from the rapid vibration of the plate upon which the material is placed and submerged in water. The velocity of the water and stone along the screen is maintained partly because of the slope of the screen, i. e. $\frac{3}{8}$ of an inch to the foot, partly due to the lifting effect of the water on the stone and partly because of the vibration of the screen, which produces a forward hopping motion of the solid material.

Having thus described the invention, what is claimed as new and desired to be secured by Letters Patent is:

1. A vibrating screen for water carried material comprising a screen frame, an approximately horizontal screen plate therefor, a flume beneath said plate, said flume having openings at one of its ends, a second screen plate for said frame inclined at an angle to said first mentioned plate, means for directing water with material to be screened over said first plate, adjusting means for one of said openings to cause the water to submerge the material on the first plate and overflow onto the second plate, resilient means for supporting said screen for movement such that any given point on the screen moves in a right line, said line being forwardly inclined from a perpendicular to the upper surface of the first screen plate, and means to impart a vibrating movement to said frame and plates only along said line.

2. Apparatus for grading granular material comprising in combination a trough-like material-receiving base, pedestals on said base, said pedestals being provided with top surfaces inclined to the horizontal, an approximately horizontal screen, leaf springs secured to said pedestals and said screen for guiding said screen for movement in a line perpendicular to the top surfaces of said pedestals, coil springs between said pedestals and screen for resiliently supporting the screen, and means for vibrating said screen so that all parts thereof tend to move only in the direction of the perpendicular line.

In testimony whereof I hereunto affix my signature.

WILLIAM STEVENSON WESTON.